United States Patent Office 3,272,803
Patented Sept. 13, 1966

1

3,272,803
2,2-ETHYLENETESTOSTERONES
Kenneth G. Holden, Stratford, N.J., assignor to Smith Kline & French Laboratories, Philadelphia, Pa., a corporation of Pennsylvania
No Drawing. Filed Feb. 25, 1965, Ser. No. 435,355
9 Claims. (Cl. 260—239.55)

This invention relates to novel testosterone derivatives and more specifically to 2,2-ethylenetestosterones. These compounds have anabolic-androgenic activity.

The compounds of this invention may be represented by the following general structural formula:

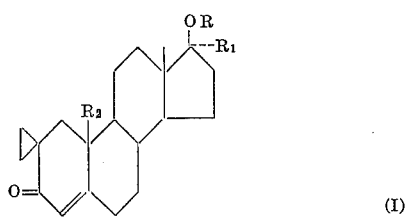

in which:

R represents hydrogen, cyclopenten-1-yl, tetrahydropyranyl, or an acyl group of from 2 to 10 carbon atoms;
$R_1$ represents hydrogen, methyl, ethyl, or ethynyl; and
$R_2$ represents hydrogen or methyl.

Exemplary of preferred acyl groups are those derived from a lower aliphatic carboxylic acid such as acetyl or propionyl, or from a substituted lower aliphatic carboxylic acid such as cyclopentylpropionyl, phenylpropionyl or p-chlorophenoxyacetyl.

The novel testosterone derivatives of this invention generally are prepared as illustrated by the following reaction:

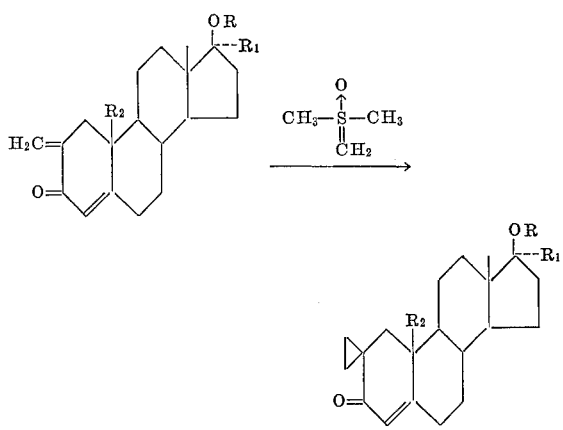

2

Thus, as shown above, the appropriately substituted 2-methylenetestosterone is reacted with a reagent formed from trimethylsulfoxonium iodide and sodium hydride called dimethylsulfoxonium methylide which produces the 2,2-ethylenetestosterone derivative. The reaction is preferably run in dimethylsulfoxide solution, described more fully in the examples.

The 2-methylenetestosterone starting materials are obtained by procedures known in the art as outlined in U.S. Patent No. 3,152,153 and J. Med. Chem., 6, 178 (1963).

The 17α-ethyl derivatives of Formula I are advantageously prepared from the corresponding 2,2-ethylene-17α-ethynyltestosterones by reduction with palladium-charcoal in dioxane until 2 moles of hydrogen are absorbed.

The cyclopentenyl ethers of Formula I are advantageously prepared from the 2,2-ethylenetestosterones by reaction with a mixture of the diethyl acetal and enolic ether of cyclopentanone.

The compounds of Formula I where R is an acyl group are prepared by either employing the desired acyl derivative of a testosterone starting material, such as the acetate, or preferably by reacting the 2,2-ethylenetestosterone derivative with the desired acyl halide or anhydride in a tertiary amine such as pyridine.

The 17-tetrahydropyranyl ethers of this invention are advantageously prepared from the corresponding 2-methylenetestosterone 17-tetrahydropyranyl ethers which are obtained from 2-methylenetestosterones by reaction with dihydropyran in the presence of an acidic catalyst such as p-toluenesulfonic acid at preferably room temperature.

The following examples illustrate the preparative procedures outlined above but are not intended to limit the scope of this invention.

*Example 1*

To a stirred solution of 2.6 g. of trimethylsulfoxonium iodide in 25 ml. of dimethylsulfoxide is added 0.5 g. of a 55.6% dispersion of sodium hydride in mineral oil. The addition is made in portions under a nitrogen atmosphere. After 10 minutes, a solution of 3.0 g. of 2-methylene-17α-methyltestosterone in 50 ml. of dimethylsulfoxide is added during 10 minutes. After stirring for 30 minutes at room temperature, the reaction mixture is heated to 55–60° C. for one hour. The cooled solution is poured into water and extracted with benzene. Evaporation of the benzene gives the crude product which is purified by chromatography followed by recrystallization from acetonehexane to give 2,2-ethylene-17α-methyltestosterone, M.P. 155–161° C.

*Example 2*

To a solution of 610 mg. of dimethylsulfoxide methiodide in 5 ml. of dry dimethylsulfoxide is added 135 mg. of sodium hydride (55.6%) in three portions with stirring under nitrogen. After 10 minutes a solution of 855 mg.

of 2-methylenetestosterone acetate in 10 ml. of dry dimethylsulfoxide is added gradually and the mixture allowed to stand at room temperature for 45 minutes. The mixture is then heated to 55° C. for one hour, poured into cold water and the separated solid is extracted with ether. The washed and dried extract is evaporated to a residue which is purified by chromatography to give 2,2-ethylenetestosterone acetate.

Hydrolysis of the above 2,2-ethylenetestosterone acetate with aqueous potassium hydroxide solution yields 2,2-ethylenetestosterone.

*Example 3*

Following the general procedure of Example 1, a mixture of 1.3 g. of dimethylsulfoxide methiodide in 10 ml. of dimethylsulfoxide and 260 mg. of sodium hydride (55.6%) is reacted with 1.7 g. of 2-methylene-17α-ethynyltestosterone in 20 ml. of dimethylsulfoxide to yield upon workup 2,2-ethylene-17α-ethynyltestosterone.

*Example 4*

To a 10 ml. mixture of the diethyl acetal and enolic ether of cyclopentanone prepared as described in Belgian Patent No. 616,243 [Chem. Abs., 58, 12633 (1963)] is added 5.5 g. of 2,2-ethylenetestosterone prepared as in Example 2. The mixture is heated for 30 minutes at 145° C. then at 180–190° C. to give a residue which is taken up in methanol containing a few drops of pyridine and recrystallized to give the cyclopenten-1-yl ether of 2,2-ethylenetestosterone.

*Example 5*

A mixture of 8.6 g. of 2,2-ethylenetestosterone prepared as in Example 2 and 100 ml. of dry pyridine is cooled and treated with 16.9 g. of p-chlorophenoxyacetyl chloride. After 24 hours at room temperature the mixture is cooled to 0° C. treated with water, quenched in brine and then taken up in ethyl acetate. Evaporation gives 2,2-ethylenetestosterone 17-p-chlorophenoxyacetate.

Similarly following the above general directions, 8.6 g. of 2,2-ethylenetestosterone is reacted with 7.6 g. of propionyl chloride, 13.3 g. of cyclopentylpropionyl chloride or 13.9 g. of phenylpropionyl chloride to give 2,2-ethylenetestosterone 17-propionate, 17-cyclopentylpropionate and 17-phenylpropionate, respectively.

*Example 6*

A solution of 500 mg. of 2,2-ethylene-17α-ethynyltestosterone (prepared as in Example 3) in 125 ml. of dioxane is shaken with hydrogen and 100 mg. of palladium-charcoal catalyst until 2 moles of hydrogen is absorbed. The reaction mixture is filtered and the filtrate evaporated to give 2,2-ethylene-17α-ethyltestosterone.

*Example 7*

To a solution of 1.0 g. of 2-methylenetestosterone in 25 ml. of benzene is added 2 ml. of dihydropyran. About 5 ml. of the mixture is distilled off and the remaining mixture is cooled to room temperature. To the cooled mixture is added 0.1 g. of p-toluenesulfonic acid and the resulting mixture maintained at room temperature for 72 hours. The reaction mixture is washed with an aqueous 5% sodium carbonate solution and then water until neutral, dried and evaporated to dryness. The residue is chromatographed to give the tetrahydropyranyl ether of 2-methylenetestosterone.

Following the general procedure of Example 1, the above ether is reacted with trimethylsulfoxonium iodide and sodium hydride in dimethylsulfoxide to yield the tetrahydropyranyl ether of 2,2-ethylenetestosterone.

*Example 8*

To a stirred solution of 2.6 g. of trimethylsulfoxonium iodide in 25 ml. of dimethylsulfoxide is added 0.5 g. of a 55.6% dispersion of sodium hydride in mineral oil, portionwise under nitrogen. After 10 minutes a solution of 2.75 g. of 2-methylene-19-nortestosterone in 50 ml. of dimethylsulfoxide is added during 10 minutes and the mixture is stirred for 30 minutes at room temperature. The reaction mixture is heated to 55–60° C. for one hour, cooled and poured into water. The resulting mixture is extracted with benzene. Evaporation of the extract gives the crude product which is purified by chromatography to yield 2,2-ethylene-19-nortestosterone.

What is claimed is:

1. A chemical compound of the formula:

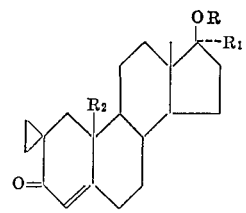

wherein:

R is a member selected from the group consisting of hydrogen, cyclopenten-1-yl, tetrahydropyranyl and acyl of from 2 to 10 carbon atoms;

$R_1$ is a member selected from the group consisting of hydrogen, methyl, ethyl and ethynyl; and $R_2$ is a member selected from the group consisting of hydrogen and methyl.

2. A chemical compound of the formula:

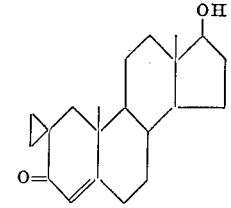

3. A chemical compound of the formula:

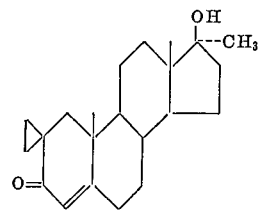

4. A chemical compound of the formula:

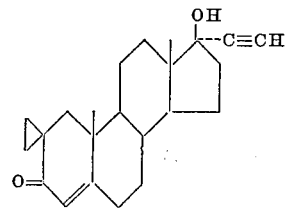

5. A chemical compound of the formula:

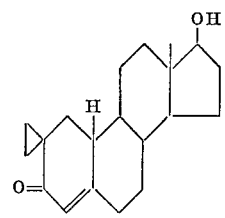

6. 2,2-ethylenetestosterone acetate.
7. 2,2-ethylenetestosterone cyclopenten-1-yl ether.
8. 2,2-ethylenetestosterone tetrahydropyranyl ether.

9. The method of preparing a 2,2-ethylenetestosterone of the formula:

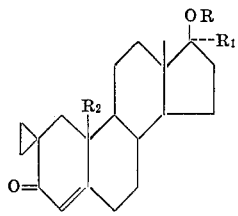

wherein:
R is a member selected from the group consisting of hydrogen and acyl of from 2 to 10 carbon atoms;
$R_1$ is a member selected from the group consisting of hydrogen, methyl and ethynyl; and
$R_2$ is a member selected from the group consisting of hydrogen and methyl, which comprises reacting a compound of the formula:

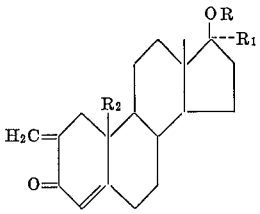

with trimethylsulfoxonium iodide in the presence of sodium hydride.

No references cited.

LEWIS GOTTS, *Primary Examiner.*

HENRY A. FRENCH, *Assistant Examiner.*

Notice of Adverse Decision in Interference

In Interference No. 96,144 involving Patent No. 3,272,803, K. G. Holden, 2,2-ETHYLENETESTOSTERONES, final judgment adverse to the patentee was rendered Sept. 17, 1968, as to claims 1 and 4.

[*Official Gazette October 29, 1968.*]